(12) United States Patent
Kenington et al.

(10) Patent No.: US 8,219,057 B2
(45) Date of Patent: Jul. 10, 2012

(54) ACTIVE ANTENNA SYSTEM AND METHOD FOR OPERATION OF AN ACTIVE ANTENNA ARRAY

(75) Inventors: Peter Kenington, Chepstow (GB); Martin Weckerle, Ulm (DE); Jonathan Moore, Ulm (DE)

(73) Assignee: Ubidyne, Inc., Wilmington, DE (US)

( * ) Notice: Subject to any disclaimer, the term of this patent is extended or adjusted under 35 U.S.C. 154(b) by 143 days.

(21) Appl. No.: 12/897,830

(22) Filed: Oct. 5, 2010

(65) Prior Publication Data

US 2012/0083232 A1    Apr. 5, 2012

(51) Int. Cl.
*H04B 17/00* (2006.01)

(52) U.S. Cl. ............... 455/226.1; 455/41.2; 455/41.1; 455/67.11; 455/67.13; 455/19; 342/368

(58) Field of Classification Search ............ 455/226.1, 455/41.2, 41.1, 67.11, 67.13, 19; 342/368
See application file for complete search history.

(56) References Cited

U.S. PATENT DOCUMENTS

| 5,559,519 A | * | 9/1996 | Fenner | 342/174 |
| 7,671,799 B1 | * | 3/2010 | Paek et al. | 342/368 |
| 2010/0240317 A1 | * | 9/2010 | Giles et al. | 455/67.13 |

* cited by examiner

*Primary Examiner* — Sanh Phu
(74) *Attorney, Agent, or Firm* — Stephen H. Eland; Dann, Dorfman, Herrell & Skillman

(57) ABSTRACT

The application relates to a method for operation of an active antenna array and to an active antenna system. The active antenna system has a signal processing unit and an active antenna array adapted to be operated with a main antenna pattern correlated to a main receive beam and with at least one test antenna pattern correlated to a test receive beam having an orientation different from the main receive beam. A main radio frequency signal is received based on the main antenna pattern and a test radio frequency signal is received based on the test antenna pattern. The main radio frequency signal comprises communications traffic. Performance of the main receive beam is assessed based on the main radio frequency signal and performance of the test receive beam is assessed based on the test radio frequency signal. The main antenna pattern is adjusted based on a comparison of the performance of the main receive beam and test receive beam.

26 Claims, 2 Drawing Sheets

ACTIVE ANTENNA SYSTEM AND METHOD FOR OPERATION OF AN ACTIVE ANTENNA ARRAY

FIELD OF THE INVENTION

The invention relates to active antenna systems comprising an active antenna array and to the operation of such active antenna array.

BACKGROUND OF THE INVENTION

The performance of antenna systems, for example in the field of mobile communications, depends on the signal quality of the radio frequency signals sent and received by the antenna. It is desirable to have sufficient performance for all users in an area covered by an antenna beam of the antenna system. The orientation of such an antenna beam is adjustable, for example by varying the tilt of the antenna.

With remotely located electrical tilt systems or electromechanical tilt mechanisms it is only possible to experiment with a new tilt setting by actually trying the new tilt and potentially suffering a detriment in coverage or quality of service for the users during the experiment. Changes to the tilt angle are therefore typically performed at infrequent intervals, for example in spring, when leaves appear on trees and in autumn, when the leaves fall off the trees. The experimental settings of the tilt angle are usually based upon recommendations given by a network coverage planning tool. In many cases the tilt angles chosen by such coverage planning tools are suboptimal, due to their imperfect knowledge of the environment of the cell served by the antenna system. Furthermore, in an existing network with already deployed antenna systems only the tilt setting can be changed by using the electrical tilt systems or electromechanical tilt mechanisms. In active antenna systems, beam forming of the antenna beam is performed by applying a specific antenna pattern. For example, a beam forming vector or a steering vector which controls the phase and/or the amplitude of the signals transmitted by each single antenna of the antenna system, determines the specific antenna pattern.

Although the orientation of the antenna beam can be varied using the electrical tilt systems or electromechanical tilt mechanisms, the prior art antenna systems do not provide the possibility to experiment with a new or different antenna pattern at an antenna site, without disturbing the existing coverage and quality of service during the experiment.

SUMMARY OF THE INVENTION

An active antenna array and a method for operation of an active antenna array are proposed.

In an aspect of a method for operation of the active antenna array of this disclosure, the active antenna array is operated with a main antenna pattern correlated to a main receive beam. The active antenna array is additionally operated with a test antenna pattern correlated to a test receive beam, wherein the test receive beam has an orientation different from that of the main receive beam. A main radio frequency signal is received based on the main antenna pattern, wherein the main radio frequency signal comprises communications traffic. A test radio frequency signal is received additionally based on the test antenna pattern. Performance of the main receive beam is assessed based on the main radio frequency signal and performance of the test receive beam is assessed based on the test radio frequency signal. The main antenna pattern is adjusted based on a comparison of the performance of the main receive beam and test receive beam.

It will be noted that the test radio frequency signal comprises the same set of signals of those of the main radio frequency signal, i.e. signals due to the communications traffic users in the cell. In other words, there is not a separately generated test pattern forming the test radio frequency signal. Using the same set of signals enables to the performance of the main receive beam to be compared to the performance of the test receive beam.

The performance of the test antenna pattern (i.e. experimental antenna pattern) can be assessed while the communications traffic is received based on the main antenna pattern without being substantially influenced or disturbed by the test antenna pattern experiments. The main antenna pattern can be adjusted depending on the test antenna pattern or set to the test antenna pattern, for example after evaluating the performance of the test antenna pattern and finding the test antenna pattern to be more suitable than the main antenna pattern.

An aspect of the active antenna system comprises an active antenna array adapted to be operated with a main antenna pattern correlated to a main receive beam and with at least one test antenna pattern correlated to test receive beam having an orientation different from the main receive beam. The active antenna system further comprises a signal processing unit. The signal processing unit is adapted to receive a main radio frequency signal based on the main antenna pattern, wherein the main radio frequency signal comprises communications traffic. The signal processor unit is further adapted to receive a test radio frequency signal based on the test antenna pattern. Furthermore, performance of the main receive beam based on the main radio frequency signal and performance of the test receive beam based on the test radio frequency signal are assessed within in the signal processing unit. The signal processor unit is further adapted to adjust a main antenna pattern based on a comparison of the performance of the main receive beam and a test receive beam.

It is further proposed to provide a computer program product embodied on a computer readable medium and comprising executable instruction for the manufacture of an active antenna system as described above, and to provide a computer program product comprising instruction that enable a processor to carry out the above described method.

DETAILED DESCRIPTION OF THE EMBODIMENTS

Figure 1:
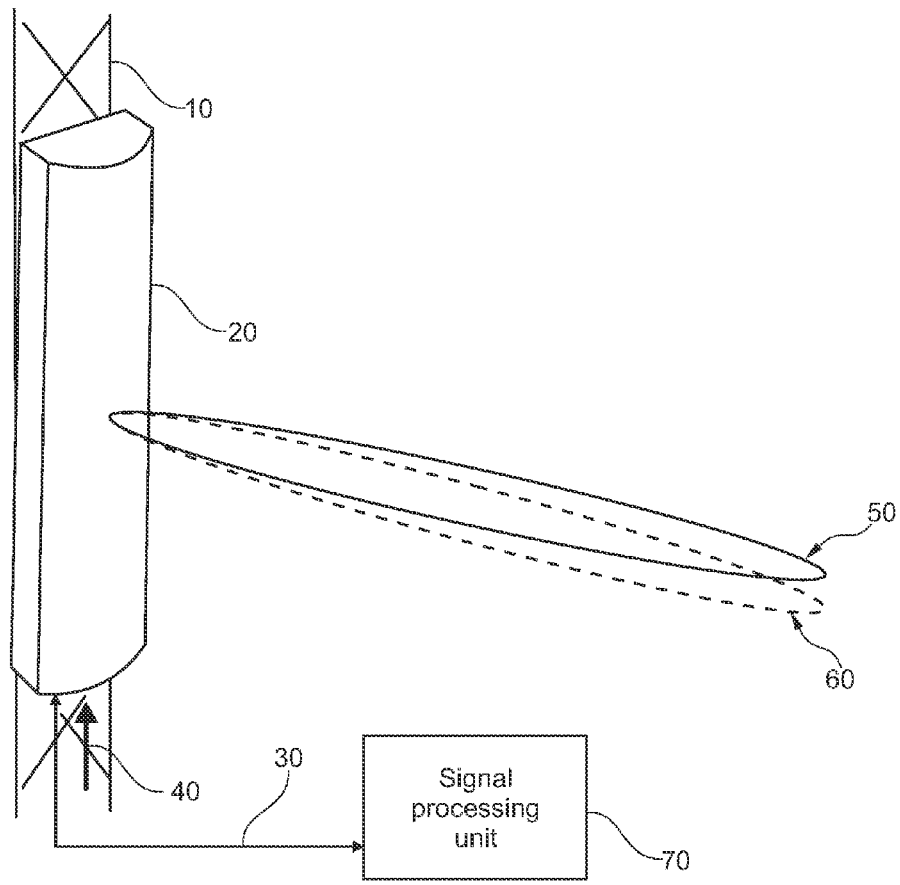
FIG. 1 shows an exemplary embodiment of an active antenna system being operated with a main antenna pattern and a test antenna pattern.

For a complete understanding of what is taught and the advantages thereof, reference is now made to the following detailed description taken in conjunction with the figures. Accordingly, further embodiments of the invention are described in conjunction with the accompanied drawings. In the drawings, like reference numerals denote similar elements or functional blocks.

It should be appreciated the various aspects of what is taught are merely illustrative of the specific ways to make and use the disclosed apparatus method and computer program product and do not therefore limit the scope of the disclosed apparatus, method and computer program product when taking into consideration with the claims and the following detailed description. It will also be appreciated that features from one embodiment may be combined with features from another embodiment.

FIG. 1 shows an exemplary arrangement of an active antenna system comprising an active antenna array 20 and a signal processing unit 70. The active antenna array 20 is mounted to a mast 10 and has a signal connection 30 to the signal processing unit 70. The signal connection 30 can be formed by an electrical connection or as an optical connection employing fibre optic. A power supply for the active antenna array 20 is provided by a power connection 40.

During operation of the active antenna array 20, radio frequency signals are transmitted and received by antenna beams. Depicted in FIG. 1 are a main receive beam 50 for receiving communications traffic and an experimental or test antenna beam 60, which differs in its orientation with respect to the main beam. In this embodiment, the test receive beam 60 has a lower tilt angle with reference to the main receive beam 50. The elliptical form of the beams 50, 60 is only of an illustrative nature and could be varied to other beam forms. Accordingly, a difference between beams 50, 60 could also be formed by different beam forms.

The active antenna array 20 is operated with a main antenna pattern correlated to the main receive beam 50 and with at least one test antenna pattern correlated to the test receive beam 60. Operation of the active antenna array 20 is for example controlled by the signal processing unit 70.

The signal processing unit 70 which may be part of a base transceiver station, BTS, is adapted to receive a main radio frequency signal based on the main antenna pattern, wherein communications traffic is comprised by the main radio frequency signal. The signal processing unit 70 is further adapted to receive a test radio frequency signal based on the test antenna pattern. It has been noted above that the same communications traffic from the users in the cell as is received by the main antenna pattern is also received by the test antenna pattern, albeit with a differing performance. Furthermore in the signal processing unit 70, performance of the main receive beam 50 based on the main radio frequency signal and performance of the test receive beam 60 based on the test radio frequencies signal is assessed. The performance of the main receive beam 50 and the performance of the test receive beam 60 are compared and the main antenna pattern can be adjusted based on said comparison.

The main receive beam 50 and the test receive beam 60 are generated by employing the different antenna patterns which are formed by different antenna vectors and/or weight vectors for processing the signals of single antenna elements of the active antenna array. Operation of the active antenna array with the main receive beam 50 and the test receive beam 60 makes it possible to handle both the wanted communications traffic within the cell covered by the main receive beam 50 and to further enable potential improvements in cell coverage or quality of service to be tried out prior to adoption within the cell based on the test receive beam 60. For example, the orientation or tilt angle of the main receive beam 50 is set based upon a recommendation from a cell planning tool by utilizing a first set of beam forming vectors as the main antenna pattern. The test receive beam 60 is formed independently of the first, main receive beam 50 using a second set of beam forming vectors which generate the test antenna pattern, The test receive beam can be steered independently and is used to try out alternative tilt angles and/or beam forms in order to assess whether the test antenna pattern offers a useful improvement over the setting of the main receive beam 50, namely the main antenna pattern.

As the main radio frequency signal and the test radio frequency signal are based on the same single antenna signals but being derived by different antenna patterns, the test receive beam does not detract from the operation of the main receive beam. Furthermore, signal strength or a signal to noise ratio, for example, of the main receive beam 50 or the main radio frequency signal are not influenced by operation of the test receive beam 60. The test receive beam 60 can therefore be regarded as operating as a separate antenna.

In further aspects of the active antenna system, it is also possible to use more than one test receive beam. For example, with the use of two test receive beams, the advantage of two independent receive beams can be analysed which could be used for applying diversity techniques like maximum ratio combining or selection diversity between the two beams compared to the usage of only one single receive beam.

Once a suitable assessment of performance of the test receive beam 60 has been undertaken, a decision can be made to adjust the main antenna pattern, for example to match the test antenna pattern or not. This process can be repeated continuously or periodically, as desired, to cope with changes which occur within the cell. Such changes can be e.g. an increasing number of femto-cell base stations located within the cell, a seasonal state of the foliage, the erection of new buildings, different distribution of communication users within the cell on weekdays and weekends, to name only a few examples.

The main radio frequency signal and the test radio frequency signal each comprise a number of corresponding active channels. There are various well known coding schemes to transmit multiple channels over a single radio frequency signal like code division multiple excess, CDMA, time division multiple access, TDMA, or frequency division multiple access, FDMA. Each of the active channels within the main radio frequency signal or the test radio frequency signal is found by at least one of the following: a despreading code for employing a CDMA technique, an allocation of a time slot within the corresponding radio frequency signal for employing a TDMA technique, and an allocation of a carrier frequency within the corresponding radio frequency signal for employing an FDMA technique.

Usually the number of theoretically possible channels is greater than the number of active channels which are actually used for transmitting data. During operation of the active antenna system, each of the number of active channels of the main radio frequency signal is processed within the signal processing unit in order to forward communications traffic. However, it is sufficient to only assess performance of a single selected channel or user within the test radio frequency signal and of the corresponding channel or user of the main radio frequency signal in order to have a common basis for the comparison of performance.

The performance values for the active channels of the main radio frequency signal and the test radio frequency signal can be assessed in different ways. For example, one or more of the following values can be assessed or determined within each channel to assess the respective performance value. A Quality of Service, QoS value, a signal strength, a Signal to Interference ratio including Noise And Distortion, SINAD value, a Received Total Wideband Power, RTWP, value, an Error Vector Magnitude, EVM, and a Peak Code Domain Error, PCDE, value.

When assessing and processing the performance of the main receive beam 50 and the test receive beam 60 within the signal processing unit 70, several ways can be chosen to decide whether the main antenna pattern should be adjusted based on the performance of the test receive beam 60. For example, a general measure of performance, e.g. based on signal strength or signal quality within the cell could be used. However, this proceeding could lead to a situation in which a particular area of the cell covered by the main receive beam 50 and the test receive beam 60, which typically has a large number of users like a plaza or train station, could dominate this general performance measure and lead to the main receive beam 50 being steered to better cover that area, to the detriment of the users elsewhere in the cell.

Another method for assessing performance of the main receive beam 50 and the test receive beam 60 would be to assess performance values of signals from all users, i.e. of all active channels within the respective radio frequency signals. Accordingly, a base band part of the signal processing unit would be duplicated such that performance values for each active channel of the main radio frequency signal and each active channel of the test radio frequency signal could be assessed at all times. As a consequence, the performance experienced by each user corresponding to an active channel could be evaluated in order to judge the improvement which a new antenna pattern, namely the test antenna pattern, resulting in a different orientation or tilt angle of the receive beam, would provide. However, when implementing such a processing scheme, an increased amount of base band hardware and software would typically be required.

A good compromise is therefore to recognise that it is not necessary to continuously receive signals or active channels from all users based on the test antenna pattern, since the aim of the experimental test receive beam 60 is only to gather performance data and not to actually serve the users with data or voice which is done by the main receive beam 50, in case of a mobile communications network. With this in mind, it is possible to time slice the use of a single channel which can be termed a measurement channel of the base band receive processing within the signal processing unit 70, amongst all users in the cell. Thereby, data on all of the performance experiences of the users can be gathered. This data can be averaged over suitable time period and can take account of users on the cell edges as well as both in a busy or popular part of the cell.

The time slicing operation is further described with reference to FIG. 2 which shows an exemplary block diagram of processing blocks within the signal processing unit 70. A first receiver processing block 71 receives signals from the active antenna array 20. For example, the main radio frequency signal and the test radio frequency signal are determined from the single antenna element signals of the active antenna array 20 within that active antenna array 20 and provided as such to the processing block 71. In another embodiment, the single antenna element signals of the active antenna array 20 are provided to the processing block 71 which determines the main radio frequency signal and a test radio frequency signal itself from said single antenna element signals. According to the aspect of FIG. 2, a CDMA technique is used to transmit the active channels via the radio frequency signal. Hence, the radio frequency signals are provided to a despreader block 72 which multiplies the radio frequency signal with a specific despreading code provided or determined by a spreading code sequencer 75 in order to receive the signal of the respective active channel which is provided to the further receiver processing block 73. In that processing block 73, the above mentioned performance value of the selected channel is determined and forwarded to a next processing block 74. The processing block 74 performs data processing of coverage and quality of service data and results processing. After the performance value of the selected channel has been processed, the processing block 74 triggers the spreading code sequencer 75 to select a next spreading code in order to process the next active channel.

Figure 2:
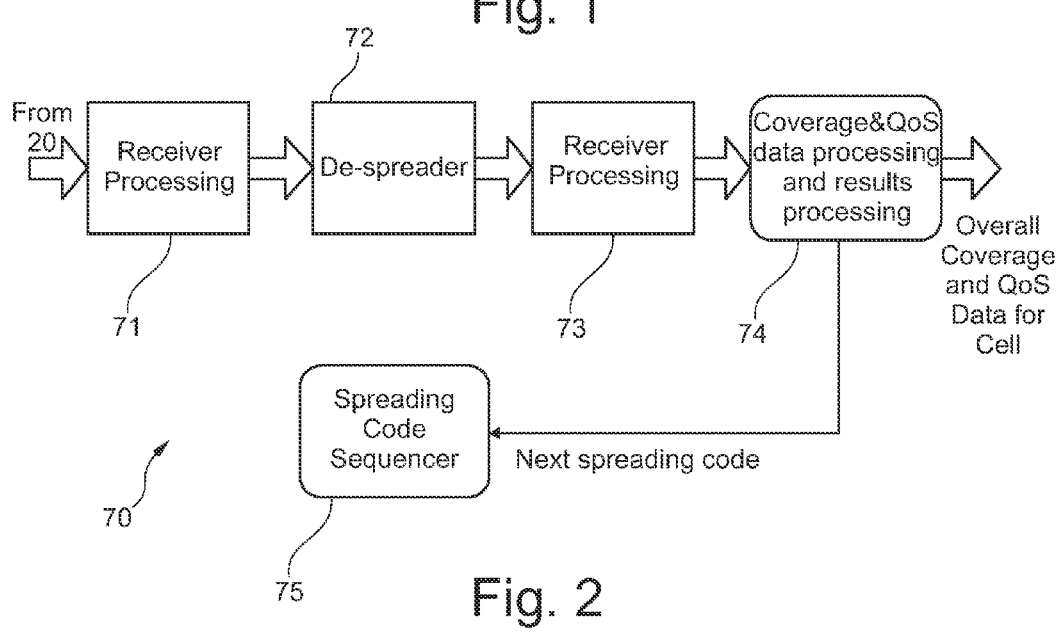
FIG. 2 shows exemplary functional blocks within a signal processing unit in accordance with FIG. 1.

It should be noted that the block diagram of FIG. 2 does not include the processing of the main radio frequency signal in order to forward communications traffic. Accordingly, only a single time slice of the test radio frequency signal is processed in order to retrieve the performance data from the selected channel. When selecting the next despreading code, a next time slice of the test radio frequency signal is processed. However, it becomes apparent from the above description that a second or even third set of processing blocks could be provided in order to assess performance values for additional channels within a single time slice of the test radio frequency signal. This sequence in which the despreading codes are selected can be a numerical order of the despreading codes or random or pseudo random. Accordingly, all of the despreading codes or despreading offsets defining such codes which are assigned to active users in the cell, are used in sequence. This makes it possible to assess the performance for all users with little effort.

In another aspect of the invention it is also possible to compare directly the performance value of a given time slice of the test radio frequency signal with the performance value of the same time slice of the main radio frequency signal. This allows a direct comparison of the performance of the test radio frequency signal and the main radio frequency signal for each ones of the users. This direct comparison can be stored in a memory element and then averaged across the cell.

In the processing block 74, all performance data gathered in the sequential process can be stored in order to determine the performance of the test receive beam 60 or test antenna pattern respectively as a whole. When determining the performance of the test receive beam 60, also coverage of the test receive beam 60 can be taken into account. To this end, the assessed performance value of each selected channel can be weighted with a weighting factor based on a location of a respective transmitting unit or a user from which said channel originated. For example, a performance value of a channel originating from an edge location of an area covered by the respective receive beam could be assigned a higher weight than the performance value of a channel originating from a center location of said area. Hence, the active antenna system can prevent that infrequent but important coverage areas such as cell edges are neglected. Furthermore, it is prevented that a cell site's energy is concentrated on a large number of users near to the active antenna array and, in affect, thereby the cell's coverage would shrink.

The location of a user from which a channel originates can be determined by a satellite based positioning system like GPS or Galileo. The location can further be determined by a geolocation software as an alternative or additional measure. The geolocation software is increasingly used in cell planning and cell performance monitoring systems. This could be employed to separate cell edge users from those closer to the active antenna array in order to select suitable weighting factors. Regarding the satellite based positioning systems, it should be noted that many mobile communication terminals are equipped with suitable receivers, for example GPS receivers.

The overall coverage and queue stator for the cell can be provided from the processing block 74 to a further processing block for comparing and adjusting the main antenna pattern. The further processing block is not shown for the purpose of a better overview. For example, the results could be feed into a cell planning or cell optimization tool which can be located within the signal processing unit 70 or externally. The data can be processed in an offline network optimization tool used in classical network planning and using the QoS data and coverage information. As an alternative, the QoS data and coverage information could be fed to an online or real time optimisation tool as are considered in self optimized networks, SoN which may be part of the signal processing unit 70.

Assessing performance of the test receive beam 60 can be performed for a selectable period of time before the main antenna pattern is adjusted. In general, a suitable time should be chosen for the test antenna pattern assessment. For example, one day or less may be suitable when a sudden change in the environment of the cell takes place, e.g. a convention comes to town, a major building is demolished, a forest is harvested etc. A longer time period could be used for optimisation of a more static environment within the cell, e.g. a normal city during the business week, wherein in this case, a period of one week can be sufficient. For example, if performance of the test receive beam for the same city at a weekend is assessed, said assessment of performance may be made over a number of weekends, before a decision to change the beam or antenna pattern is taken.

Accordingly, the period of time before the main antenna pattern is adjusted may be selected based on at least one of the following, a weekday of operation, a detected change of environment in an area related to the test receive beam, a detected change of environment in an area related to the main receive beam.

Figure 3:
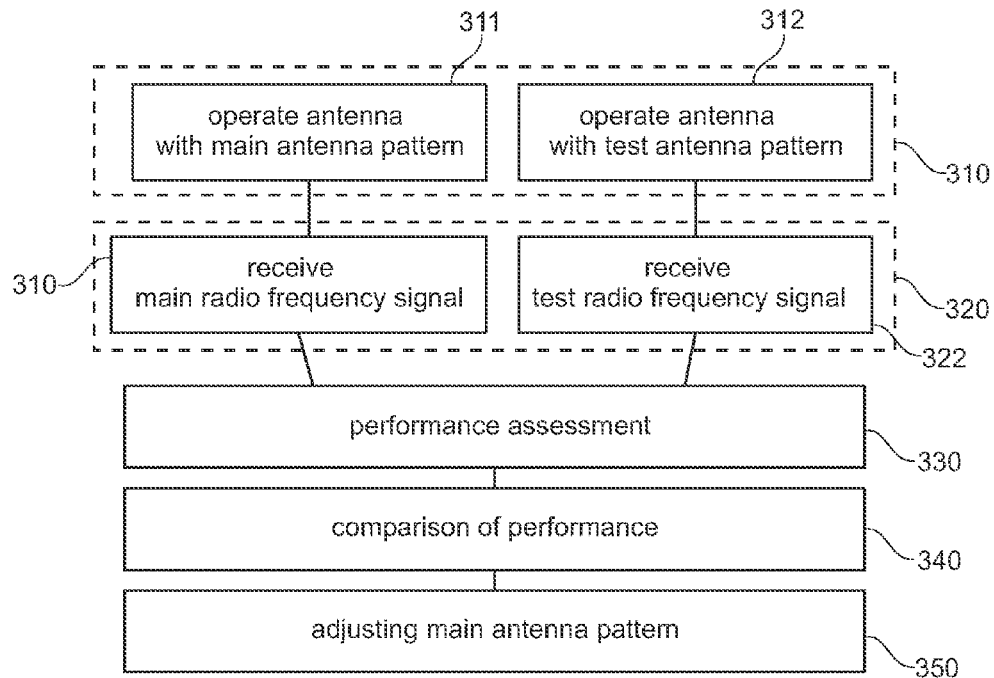
FIG. 3 shows an exemplary workflow of a method for operation of an active antenna array.

FIG. 3 shows a block diagram of a method for operation of an active antenna array in a general overview. Block 310 relates to the operation of the active antenna array and comprises two sub blocks 311, 312. With referenced to block 311, the active antenna array is operated with a main antenna pattern which is correlated to a main receive beam 50. Concurrently, with reference to block 312, the same active antenna array is operated with a test antenna pattern correlated to a test receive beam 60. The test receive beam 60 has a different orientation than the main receive beam. Accordingly, block 320 relates to concurrent reception of radio frequency signals, wherein in block 321, a main radio frequency signal is received based on the main antenna pattern, and in block 322 a test radio frequency signal is received based on the test antenna pattern. At least the main radio frequency signal comprises communications traffic which is processed and forwarded to a communications network, for example.

In block 330, performance is assessed as well of the main receive beam 50 based on the main radio frequency signal as of the test receive beam 60 based on the test radio frequency signal. As described before with respect to FIGS. 1 and 2, the main radio frequency signal and the test radio frequency signal each can comprise a number of active user channels for which one or more respective performance values can be assessed in order to find the performance of the respective receive beam as a whole.

The performance of the main receive beam 50 and the test receive beam 60 assessed in block 330 are compared in block 340. The comparison process can also comprise collecting performance values over a selectable period of time, and taking into account coverage of the test receive beam 60 and the main receive beam 50 respectively. In particular, collected performance values can be weighted depending on a location from which the respective underline channel originated in order to keep the coverage of the beam as high as possible.

Based on the comparison of block 340, the main antenna pattern is adjusted in block 350. The process of block 350 can be performed in an offline cell planning or cell optimisation tool or otherwise with respect to a self optimised network. Regarding the adjustment of the antenna pattern, it should be noted that evaluation of the receive beam is related to an uplink connection of the active antenna system. A downlink performance relating to a transmit beam of the active antenna system can therefore only be estimated. As a result, different strategies of adjusting the antenna pattern can be chosen.

For example, having found an improved test antenna pattern, said test antenna pattern can be used as the main antenna pattern for the receive beam of the active antenna array. An antenna pattern for a transmit beam which in general can be different from the receive beam could be kept as it is or altered in a similar manner to the receive beam, as desired.

In a different aspect of the disclosure, the cell planning or cell optimisation tool is used to predict the performance of the downlink or transmit beam which would result when changing the current downlink pattern to a new downlink pattern based on the improved test antenna pattern. In case it is expected that the downlink performance will improve as well, adjustment of both the uplink and downlink antenna patterns can then be chosen.

Figure 4:
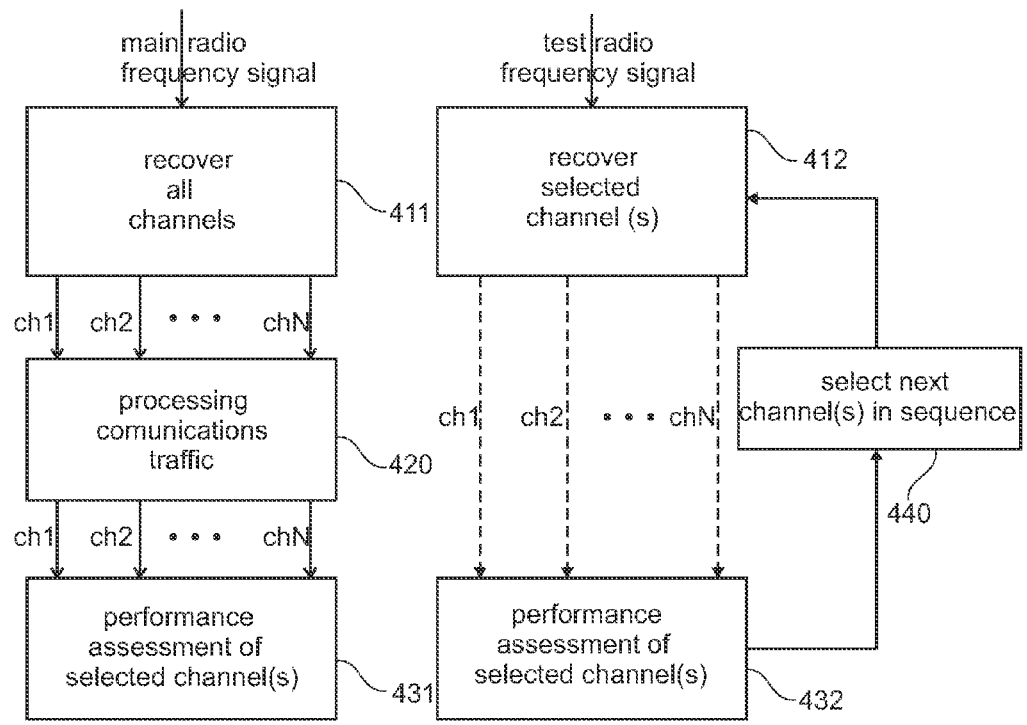
FIG. 4 shows an exemplary functional block diagram of signal processing within an active antenna system.

FIG. 4 shows a flowchart concerning the processing of the main radio frequency signal and the test radio frequency signal. In particular, the concurrent processing of the active channels comprised by the radio frequency signals becomes apparent from FIG. 4. To this end, in block 411, all active user channels are recovered from the main radio frequency signal, for example by applying the respective despreading codes or despreading offsets, dedicated respectively to the active user channels. Concurrently, one or more selected channels are recovered from the test radio frequency signal, for example by applying one or more selected despreading codes or offsets. The channels are referenced as ch1, ch2, . . . , chN in this figure. Both the main radio frequency signal and the test radio frequency signal comprise the same number of N channels, wherein the same channel number denotes an identical despreading code or offset.

In the further processing of the main radio frequency signal, in block 420 the communications traffic comprised in the channels ch1, ch2, . . . , chN is processed and, for example, forwarded to a communications network (not shown here). Furthermore in block 431, performance of the one or more selected channels of the main radio frequency signal is assessed according to the above description. Concurrently, in block 432, performance of said selected channels of the test radio frequency signal. Preferably, performance of the same selected channels of the main radio frequency signal and the test radio frequency signal respectively is assessed.

After assessment of the performance of the selected channel or channels on a test radio frequency signal, the next channel or channels in sequence is selected such that in a following time slice a different channel is recovered from the test radio frequency signal and performance is assessed for that different channel.

It is also possible that for the main radio frequency signal the performance of all channels is assessed anyway for other purposes. However, it is desirable that a performance value is assessed for both corresponding channels in the main radio frequency signal and the test radio frequency signal in order to have a good basis for the comparison of performance. It can be seen from the above description that only one or more additional receiver processing channels have to be provided in the base band processing for a performance assessment of the test radio frequency signal. Herein, the number of additional receiver channels depends on the number of channels which are recovered for each time slice of the test radio frequency signal.

The procedures and methods described above allow new tilt angles or beam forms to be tried before a formal adoption within the active antenna system. Thereby potentially detrimental changes to processing of communications traffic are substantially avoided. Furthermore, operators of the active antenna systems are enabled to experiment, for example automatically, with alternative coverage models without impacting current service levels at all. Additionally, the described method and procedures allow the closure of the loop between network planning predictions and actual field operation, again without any detrimental effects on the network, while testing in real time.

While various embodiments of the disclosed apparatus, method and computer-program product have been described above, it should be understood that they have been presented by way of example, and not limitation. It will be apparent to persons skilled in the relevant arts that various changes in form and detail can be made therein without departing from the scope of what is taught. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the disclosed apparatus, method and computer-program product may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, what is disclosed should not be limited by any of the above-described exemplary embodiments, but should be defined only in accordance with the following claims and their equivalents.

The invention claimed is:

1. A method for operation of an active antenna array, comprising:
operating the active antenna array with a main antenna pattern correlated to a main receive beam;
operating the active antenna array with a test antenna pattern correlated to a test receive beam, the test receive beam having an orientation different from the main receive beam;
receiving a main radio frequency signal based on the main antenna pattern, the main radio frequency signal comprising communications traffic;
receiving a test radio frequency signal based on the test antenna pattern;
assessing performance of the main receive beam based on the main radio frequency signal;
assessing performance of the test receive beam based on the test radio frequency signal; and
adjusting the main antenna pattern based on a comparison of the performance of the main receive beam and the test receive beam.

2. The method of claim 1, wherein the main radio frequency signal and the test radio frequency signal each comprise a plurality of corresponding active channels.

3. The method of claim 2, wherein each of the corresponding active channels is defined by at least one of the following:
a despreading code;
an allocation of a time slot within the corresponding radio frequency signal;
an allocation of a carrier frequency within the corresponding radio frequency signal.

4. The method of claim 2, wherein assessing performance comprises assessing a performance value for at least one selected active channel of the test radio frequency signal and assessing a performance value for the corresponding selected active channel of the main radio frequency signal.

5. The method of claim 4, wherein assessing of a performance value comprises assessing at least one of the following:
a Quality of Service, QoS, value;
a signal strength;
a signal-to-interference ratio including noise and distortion, SINAD, value;
a Received Total Wideband Power, RTWP, value;
an Error Vector Magnitude, EVM, value;
a Peak code domain error, PCDE, value.

6. The method of claim 2, further comprising processing each of the number of active channels of the main radio frequency signal in order to forward communications traffic.

7. The method of claim 4, wherein each of the active channels of the test radio frequency signal is selected in sequence in order to assess the respective performance value.

8. The method of claim 7, wherein said sequence is random or pseudo-random.

9. The method of claim 1, wherein adjustment of the main antenna pattern is based on a coverage of the test receive beam.

10. The method of claim 1, wherein the orientation of the main receive beam and the orientation of the test receive beam differ in their tilt angle.

11. The method of claim 1, wherein assessing the performance of the test receive beam is performed for a selectable period of time before the main antenna pattern is adjusted.

12. The method of claim 11, wherein said period of time is selected based on at least one of the following:
a weekday of operation;
a detected change of environment in an area related to the test receive beam;
a detected change of environment in an area related to the main receive beam.

13. The method of claim 4, wherein the comparison of the performance comprises weighting the assessed performance values of each selected channel based on a location of a respective transmitting unit from which said channel originated.

14. The method of claim 13, wherein the location is determined by one of a satellite based positioning system or a geolocation software.

15. The method of claim 13, wherein a performance value of a channel originating from an edge location of an area covered by the respective receive beam has a higher weight than the performance value of a channel originating from a center location of said area.

16. An active antenna system, comprising:
an active antenna array adapted to be operated with a main antenna pattern correlated to a main receive beam and with at least one test antenna pattern correlated to a test receive beam having an orientation different from the main receive beam; and
a signal processing unit adapted
to receive a main radio frequency signal based on the main antenna pattern, the main radio frequency signal comprising communications traffic;
to receive a test radio frequency signal based on the test antenna pattern;
to assess performance of the main receive beam based on the main radio frequency signal;
to assess performance of the test receive beam based on the test radio frequency signal; and
to adjust the main antenna pattern based on a comparison of the performance of the main receive beam and the test receive beam.

17. The active antenna system of claim 16, wherein the main radio frequency signal and the test radio frequency signal each comprise a number of corresponding active channels and the signal processing unit is adapted to assess a performance value for at least one selected active channel of the test radio frequency signal and to assess a performance value for the corresponding selected active channel of the main radio frequency signal.

18. The active antenna system of claim 17, wherein the signal processing unit is adapted to assess a performance value by assessing at least one of the following:
a Quality of Service, QoS, value;
a signal strength;
a signal-to-interference ratio including noise and distortion, SINAD, value;
a Received Total Wideband Power, RTWP, value;
an Error Vector Magnitude, EVM, value;
a Peak code domain error, PCDE, value.

19. The active antenna system of claim 17, wherein the signal processing unit is adapted to process each of the number of active channels of the main radio frequency signal in order to forward communications traffic.

20. The active antenna system of claim 17, wherein the signal processing unit is adapted to select each of the active channels of the test radio frequency signal in sequence in order to assess the respective performance value.

21. The active antenna system of claim 16, wherein the signal processing unit is adapted to adjust the main antenna pattern based on a coverage of the test receive beam.

22. The active antenna system of claim 16, wherein the signal processing unit is adapted to assess performance of the test receive beam for a selectable period of time before the main antenna pattern is adjusted.

23. The active antenna system of claim 17, wherein the signal processing unit is adapted to compare the performance by weighting the assessed performance values of each selected channel based on a location of a respective transmitting unit from which said channel originated.

24. The active antenna system of claim 17, wherein a performance value of a channel originating from an edge location of an area covered by the respective receive beam has a higher weight than the performance value of a channel originating from a center location of said area.

25. A computer program product embodied on a computer-readable medium and comprising executable instructions for the manufacture of the active antenna system of comprising:
an active antenna array adapted to be operated with a main antenna pattern correlated to a main receive beam and with at least one test antenna pattern correlated to a test receive beam having an orientation different from the main receive beam; and
a signal processing unit adapted
to receive a main radio frequency signal based on the main antenna pattern, the main radio frequency signal comprising communications traffic;
to receive a test radio frequency signal based on the test antenna pattern;
to assess performance of the main receive beam based on the main radio frequency signal;
to assess performance of the test receive beam based on the test radio frequency signal; and
to adjust the main antenna pattern based on a comparison of the performance of the main receive beam and the test receive beam.

26. A computer program product comprising instructions that enable a processor to carry out the method of—
operating the active antenna array with a main antenna pattern correlated to a main receive beam;
operating the active antenna array with a test antenna pattern correlated to a test receive beam, the test receive beam having an orientation different from the main receive beam;
receiving a main radio frequency signal based on the main antenna pattern, the main radio frequency signal comprising communications traffic;
receiving a test radio frequency signal based on the test antenna pattern;
assessing performance of the main receive beam based on the main radio frequency signal;
assessing performance of the test receive beam based on the test radio frequency signal; and
adjusting the main antenna pattern based on a comparison of the performance of the main receive beam and the test receive beam.

* * * * *